(No Model.)

A. F. RANSOM.
HORSE COLLAR FASTENING.

No. 377,050. Patented Jan. 31, 1888.

Witnesses:

Inventor
Albert F. Ransom
by Henry Calver
Atty.

UNITED STATES PATENT OFFICE.

ALBERT F. RANSOM, OF BURLINGTON, WISCONSIN.

HORSE-COLLAR FASTENING.

SPECIFICATION forming part of Letters Patent No. 377,050, dated January 31, 1888.

Application filed June 16, 1887. Serial No. 241,538. (No model.)

*To all whom it may concern:*

Be it known that I, ALBERT F. RANSOM, a citizen of the United States, residing at Burlington, in the county of Racine and State of Wisconsin, have invented certain new and useful Improvements in Horse-Collar Fastenings, of which the following is a specification, reference being had therein to the accompanying drawings.

My invention relates to fastenings for horse-collars which are formed in two parts hinged together at their tops to permit the collar to be opened in front, so as to be placed on the neck of the animal right side up, and thereby avoid the trouble of turning the collar after passing it over the animal's head; the object of my invention being to provide cheap and convenient fastenings which are also adapted to serve as caps to protect the abutting ends of the two parts of the separable collar.

Figure 1:
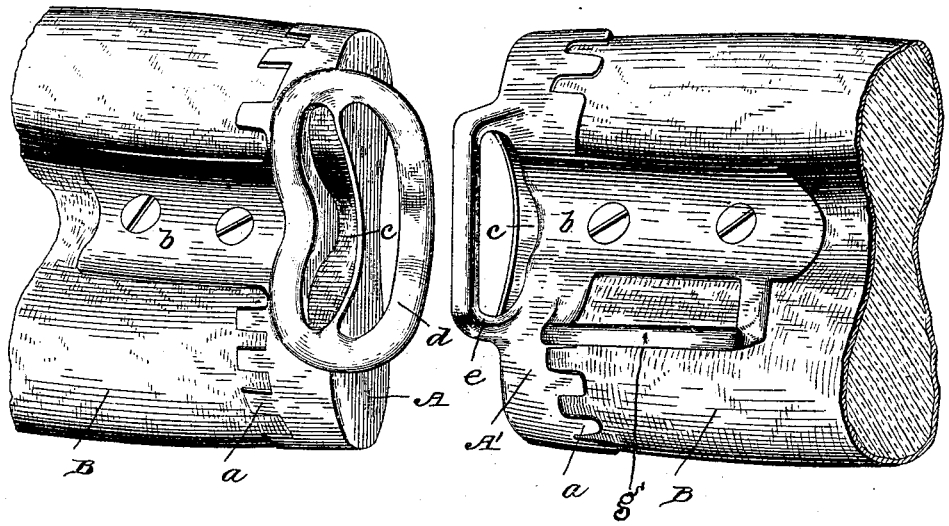
Figure 2:
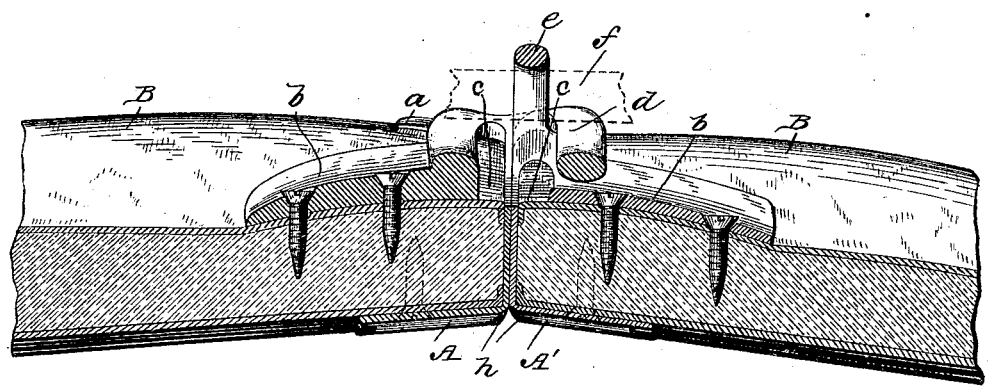

In the drawings, Figure 1 represents the lower ends of the two parts of a separable horse collar with my caps and fastenings applied thereto. Fig. 2 is a sectional view of the same with the caps abutted or in fastening position.

The socket pieces or caps A and A' are of proper size to receive the abutting ends of the halves B of the collar. These socket pieces or caps are preferably of malleable iron or other comparatively-soft metal, and are provided with dentated edges or teeth $a$, which are made somewhat flaring, so that the caps may easily be set in place on the collar-pieces B, and when they are in position the said teeth may be bent inward slightly to steady the caps and assist in securing them to the said collar-pieces. The caps are also provided with concave lugs or arms $b$, by which they may be securely attached to the collar-pieces by suitable screws or bolts, and in order that it may be seen when the said caps are in proper position against the ends of the collar-pieces to be fastened I prefer to provide them with openings $c$.

On the cap A is formed a loop, $d$, projecting beyond the end of the said cap far enough to receive an outwardly-projecting loop or staple, $e$, on the cap A', the loop or staple $e$ being of proper length to extend through the loop $d$ to receive a suitable key, as $f$, (or the end of the hame-strap,) which will prevent the disengagement of the fasteners. The cap or fastener A' is also preferably provided with a loop, $g$, to receive the martingale-strap.

To prevent the caps or fasteners from galling the animal's neck, I bevel off or cut away the adjacent inner edges of the said caps, as at $h$.

To fasten together the parts of a separable collar provided with my cap fastenings, it is only necessary to spring the loop $d$ of the cap A over the loop or staple $e$ of the cap A', and then insert a key or strap, $f$, into the latter loop to hold the said loops interlocked.

Having thus described my invention, I claim and desire to secure by Letters Patent—

1. A horse-collar fastening consisting of two caps provided with dentated edges $a$ and with lugs or arms $b$, one of the said caps having a loop, $d$, and the other a loop or staple, $e$, substantially as set forth.

2. A horse collar fastening consisting of two caps provided with interlocking loops $d$ and $e$, the said caps being beveled or cut away, as at $h$, on their adjacent inner edges to prevent galling, substantially as set forth.

3. A horse-collar fastening consisting of the caps A A', provided with suitable interlocking loops, $d$ and $e$, the said caps being also provided with the openings $c$, substantially as set forth.

In testimony whereof I affix my signature in presence of two witnesses.

ALBERT F. RANSOM.

Witnesses:
 EDWARD E. MILLS,
 CARRIE KLEINKOPP.